United States Patent [19]

Kondo

[11] Patent Number: 4,881,767
[45] Date of Patent: Nov. 21, 1989

[54] LATCH DEVICE FOR FOLDABLE BACKREST OF AUTOMOTIVE SEAT

[75] Inventor: Nobuaki Kondo, Chigasaki, Japan

[73] Assignee: Nissan Motor Co., Ltd., Japan

[21] Appl. No.: 283,829

[22] Filed: Dec. 13, 1988

[30] Foreign Application Priority Data

Dec. 23, 1987 [JP] Japan ................................. 62-328008

[51] Int. Cl.⁴ .............................................. E05C 3/26
[52] U.S. Cl. ..................... 292/224; 292/226; 292/227; 296/65.1; 297/379
[58] Field of Search ....................... 296/65.1; 297/379; 292/207, 224, 226, 227

[56] References Cited

U.S. PATENT DOCUMENTS

| | | | |
|---|---|---|---|
| 180,563 | 11/1917 | Aubin | 292/207 |
| 193,092 | 7/1877 | Joyce | 292/224 |
| 3,405,971 | 10/1968 | Kobrehel | 297/379 |
| 4,667,492 | 5/1987 | Tomatsu et al. | 297/379 X |
| 4,721,338 | 1/1988 | Kondo | 297/379 |

FOREIGN PATENT DOCUMENTS 61-21836  1/1986  Japan .
61-21837  1/1986  Japan .
0229625 10/1986 Japan .................................. 296/65.1

Primary Examiner—Lloyd A. Gall
Attorney, Agent, or Firm—Leydig, Voit & Mayer

[57] ABSTRACT

Herein disclosed is a latch device for use with a foldable backrest of an automotive seat. The latch device comprises a striker secured to a fixed member other than the backrest; a base member secured to the backrest to move therewith; a latch plate pivotally supported by the base member, the latch plate being latchingly engageable with the striker when the backrest assumes a given raised position; a lock lever pivotally supported by the base member and having a portion contactable with a peripheral portion of the latch plate; biasing means for biasing the lock lever and the latch plate in the same direction; connecting means for selectively connecting the latch plate and the lock lever to achieve an integrated pivoting movement of the latch plate and the lock lever; and actuating means for actuating the connecting means, the actuating means including a projection which, upon operation of the actuating means, pushes the latch plate to rotate the same in a direction to cancel the latched engagement between the latch plate and the striker and at the same time to induce a folding of the foldable backrest.

11 Claims, 3 Drawing Sheets

LATCH DEVICE FOR FOLDABLE BACKREST OF AUTOMOTIVE SEAT

BACKGROUND OF THE INVENTION

1. Field of the Invention

The present invention relates in general to latch devices, and particularly to latch devices of a type which latches a pivotal member. More specifically, the present invention is concerned with a latch device for latching a foldable backrest of an automotive rear seat which provides, when folded, a tunnel between passenger room and a trunk room.

2. Description of the Prior Art

Hitherto, various latch devices of the above-mentioned type have been proposed and put into practical use particularly in the field of passenger cars. Some of them, such as those disclosed in Japanese Patent First Provisional Publications 61-21836 and 61-21837, are designed to have an anti-theft mechanism by which locking and unlocking of the foldable backrest are possible from only the trunk room.

However, the conventional latch devices disclosed in these publications have the following drawbacks due to their inherent constructions.

That is, when folding of the backrest is needed by a person who stands beside an opened trunk room and has just finished unlocking of the foldable backrest, he has to throw his body into the trunk room and reach out his hand to push the unlocked backrest forward. This work is troublesome or at least difficult.

Furthermore, when, with the latch device being in locked condition, a pull strap exposed to the passenger room is strongly pulled by a person who does not know that the backrest has been locked, it tends to occur that the latch device is damaged severely.

SUMMARY OF THE INVENTION

It is therefore an object of the present invention to provide an improved latch device for a foldable backrest, which is free of the above-mentioned drawbacks.

According to the present invention, there is provided a latch device which permits the foldable backrest to be folded from a trunk room by only manipulating a control knob exposed to the trunk room.

According to the present invention, there is provided a latch device which permits a person handling the pull strap to easily recognize that the latch device has been locked.

According to the present invention, there is provided a latch device for use with a foldable backrest of an automotive seat. The latch device comprises a striker secured to a fixed member other than the backrest; a base member secured to the backrest to move therewith; a latch plate pivotally supported by the base member, the latch plate being latchingly engageable with the striker when the backrest assumes a given raised position; a lock lever pivotally supported by the base member and having a portion contactable with a peripheral portion of the latch plate; biasing means for biasing the lock lever and the latch plate in the same direction; connecting means for selectively connecting the latch plate and the lock lever to achieve an integrated pivoting movement of the latch plate and the lock lever; and actuating means for actuating the connecting means, the actuating means including a projection which, upon operation of the actuating means, pushes the latch plate to rotate the same in a direction to cancel the latched engagement between the latch plate and the striker and at the same time to induce a folding of the foldable backrest.

BRIEF DESCRIPTION OF THE DRAWINGS

Other objects and advantages of the present invention will become apparent from the following description when, taken in conjunction with the accompanying drawings, in which.

DETAILED DESCRIPTION OF THE INVENTION

Figure 4:
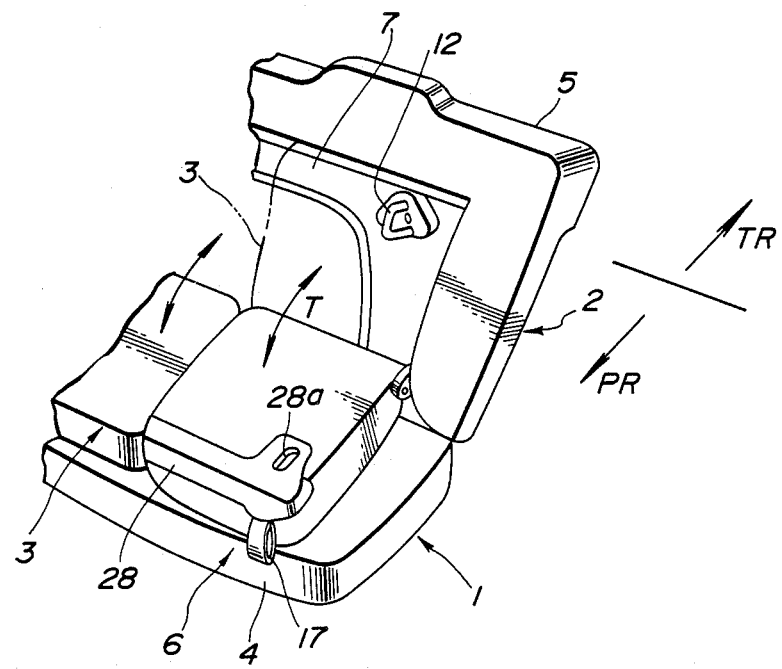
FIG. 4 is a perspective view of an automotive rear seat having foldable backrests each being incorporated with the latch device of the present invention.

Referring to FIG. 4, there is shown an automotive rear seat 1 which comprises a seat cushion part 4 mounted on a floor of a vehicle body 2 and two seatback parts 3 pivotally mounted on the seat cushion part 4. That is, each seatback part 3 is pivotal, relative to the vehicle body 2, between a raised position as illustrated by a phantom line and a folded position as illustrated by a solid line. As is shown, when the backrest part 3 assumes the folded position, there is produced a tunnel "T" through which a trunk room "TR" is exposed to a passenger room "PR".

Designated by numeral 5 in FIG. 4 is an arch-like board member which is secured to the vehicle body 2 and has a recess into which the two backrest parts 3 are neatly received when the same assume the raised positions. Thus, the arch-like board member 5 serves as a part of a seatback portion of the rear seat 1. Designated by numeral 7 is an apertured back panel by which the passenger room "PR" and the trunk room "TR" are bounded.

For the pivotal movement of the seatback parts 3, there are arranged known hinges (no numerals) between each seatback parts 3 and the vehicle body 2.

The backrest parts 3 are respectively equipped with the same latch devices 6 according to the present invention.

Thus, for ease of description, the following description is directed to only the latch device 6 which incorporated with the right-positioned backrest part 3 as viewed in FIG. 4.

The latch device 6 comprises generally two major mechanisms, viz., a first mechanism 8 (see FIG. 1) which is carried by the backrest part 3 and a second mechanism 9 (see FIG. 1) which is connected to the back panel 7 in a manner to be exposed to the trunk room "TR".

Figure 1:
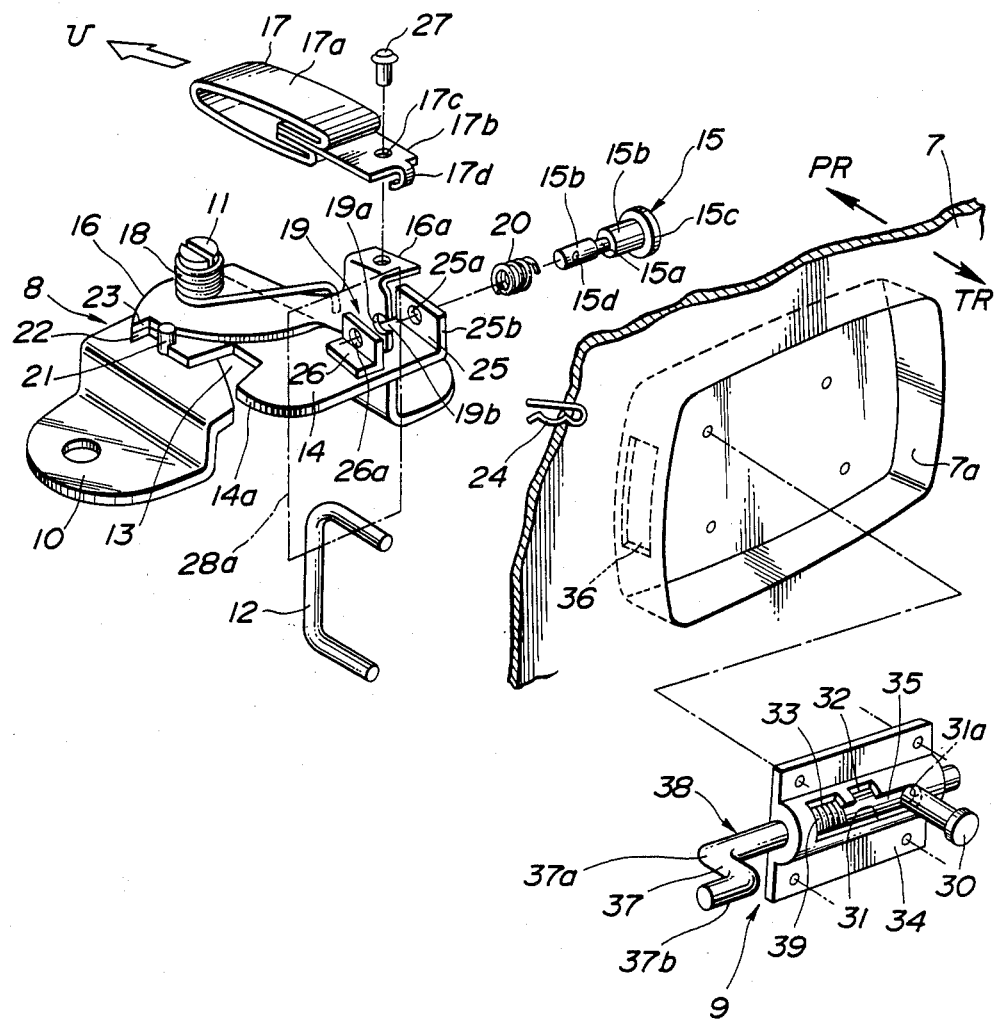
FIG. 1 is an exploded view of a latch device according to the present invention.

As is seen from FIG. 1, the first mechanism 8 comprises a generally U-shaped striker 12 which is fixed to the back panel 7 in a manner to project into the passenger room "PR". The backrest part 3 has at its back wall a slot 28a into which the striker 12 is inserted upon raising of the backrest part 3.

Essential parts of the first mechanism 8 are substantially entirely installed in the backrest part 3, which comprise, as is seen from FIG. 1, a stepped base plate 10 which is secured by bolts or the like to an upper portion of a structural base of the backrest part 3. The base plate 10 has a pivot pin 11 by which a latch plate 14 is pivotally held in a manner to be exposed to the slot 28a. The latch plate 14 has a recess 13 which is latchingly engageable with the striker 12 upon raising of the backrest part 3.

The latch plate 14 has at its free end a bent-up portion 25 with an opening 25a. A bracket 26 with an opening 26a is secured to the latch plate 14 near the bent-up portion 25 in a manner to allow the opening 26a to face the opening 25a of the bent-up portion 25.

A pin 15 is axially movably held by the bent-up portion 25 and the bracket 26. The pin 15 comprises two spaced larger diameter portions 15b, a smaller diameter portion 15a defined between the larger 15c formed on an end of one larger diameter portion 15b. The other larger diameter portion 15b is formed with a small hole 15d. Upon assembly, the larger diameter portions 15b are respectively received in the openings 25a and 26a having the smaller diameter portion 15a placed between the bent-up portion 25 and the bracket 26. A coil spring 20 is disposed about the pin 15 and compressed between the circular head portion 15c and the bent-up portion 25 thereby to bias the pin 15 in a direction away from the bent-up portion 25. A snap pin 24 is engaged with the small hole 15d to suppress dismantling of the pin 15.

A lock lever 16 is pivotally held by the pivot pin 11, which has a raised free end 19 insertable into the space defined between the bent-up portion 25 and the bracket 26. The raised free end 19 is formed with a recess which comprises a circular portion 19a and a narrow throat portion 19b. The circular portion 19a is so sized as to allow the larger diameter portions 15b of the pin 15 to axially move therein, while, the narrow throat portion 19b is so sized as to allow only the smaller diameter portion 15a to pass therethrough.

The lock lever 16 has a bent-down portion (no numeral) which abuts on one side of the latch plate 14. A coil spring 18 is disposed about the pivot pin 11 having one end hooked to the lock lever 16. With the force of the spring 18, the lock lever 16 is biased in a clockwise direction in FIG. 1 thereby pushing at the bent-down portion the latch plate 14 in the same direction. In order to suppress excessive pivoting of the latch plate 14 and the lock lever 16, there is arranged on the base plate 10 a stopper pin 21 which is received in a recess 22 formed in the latch plate 14 and to which a projection 23 of the lock lever 16 is contactable.

Figure 2:
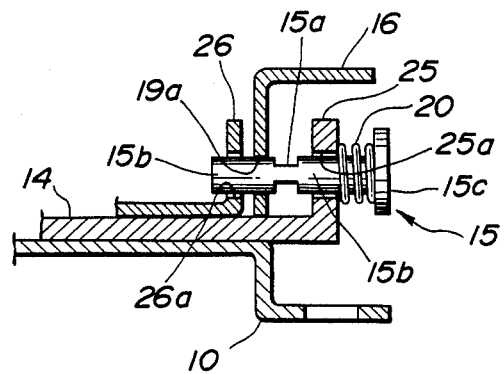
FIGS. 2 and 3 are sectional views of an essential portion of the latch device, showing different of the portion respectively.

It is to be noted that when the latch plate 14 and the lock lever 16 assume the illustrated positions relative to the stopper pin 21, the bent-down portion of the lock lever 16 abuts on the side of the latch plate 14 and the raised free end 19 of the lock lever 16 is placed between the bent-up portion 25 and the bracket 26 having the larger diameter portion 15b of the pin 15 received in the circular portion 19a of the recess, as will be understood from FIG. 2. Thus, when, under this condition, the lock lever 16 is pulled in the direction of the arrow "v" in FIG. 1, the lock lever 19 and the latch plate 14 are pivoted together in a counterclockwise direction by an angle determined between the stopper pin 21 and the projection 23 of the lock lever 16 thereby causing the latch plate 14 to release the striker 12.

For pulling the lock lever 16 in the direction of "v" from the passenger room "PR", there is employed a strup member 17. The strup member 17 is pivotally connected through a pin 27 to an apertured lug portion 16a formed on the raised free end 19 of the lock lever 16. The strup member 17 comprises a strup proper 17a and a metal base 17b by which the strup proper 17a is held. The metal base 17b is pivotally connected to the lug portion 16a by the pin 27 which engages an opening 17c formed in the metal base 17b. The metal base 17b further has a pawl 17d engaged with the lug portion 16a of the lock lever 16. As will be understood from FIG. 4, when the backrest part 3 assumes the raised position, a tip of the strup proper 17a is exposed to the passenger room "PR".

Designated by numeral 14a is a curved peripheral portion of the latch plate 14, against which the striker 12 abuts when the backrest proper 3 is about to assume the raised position. That is, after the abutment being carried out, the latch plate 14 is pivoted about the pivot pin 11 in a counterclockwise direction against the force of the spring 18 allowing the curved peripheral portion 14a to slide on the striker 12 and finally causing the striker 12 to fall into the recess 13 of the latch plate 14 achieving latched condition of the backrest part 3 relative to the back panel 7.

As will be understood from FIG. 4, a decorative cover 28 is mounted on the upper part of the backrest part 3 to cover the above-mentioned first mechanism 8. The decorative cover 28 has an extension in which the slot 28a is formed.

As is seen from FIG. 1, the second mechanism 9 is installed in a rectangular recess 7a which is provided by the back panel 7 in a manner to be exposed to the trunk room "TR". The recessed portion is formed at one side wall with a rectangular slot 36 which is exposed to the passenger room "PR".

The second mechanism 9 comprises a rectangular base member 34 which has an elongate guide groove 31 formed therein. The groove 31 has first and second notches 32 and 33 merged therewith. A crank shaft 38 is axially slidably held by the base member 34. That is, the crank shaft 38 comprises a longer shaft part 35 slidably held in the guide groove 31 and a normally bent shaft part 37 projected into the passenger room "PR" through the rectangular slot 36 of the back panel 7. A knob 30 is fixed to the longer shaft part 35 to move therewith. A coil spring 39 is disposed about a part of the longer shaft part 35 to bias the crank shaft 38 rightward in FIG. 1, that is, in a direction to press the knob 30 against a rightside end 31a of the groove 31.

As will become apparent as the description proceeds, the normally bent shaft part 37 of the crank shaft 38 has both a first portion 37a which is contactable with the head portion 15c of the pin 15 and second portion 37b which is slidably contactable with an edge portion 25b of the bent-up portion 35 of the latch plate 14.

In the following, operation of the latch device according to the present invention will be described with reference to the drawings, particularly FIG. 1.

For ease of understanding, the description will be commenced with respect to a raised but unlocked condition of the backrest part 3 wherein the backrest part 3 assumes its raised position without being locked. Under this condition, the latch plate 14 latches the striker 12 and the lock lever 16 is biased to abut on the side of the latch plate 14 by the work of the spring 18. Furthermore, under this condition, the pin 15 assumes the position as shown in FIG. 2 wherein the smaller diameter portion 15a of the pin 15 is mismatched with the narow throat portion 19b of the recess of the raised free end 19 of the lock lever 16, and the knob 30 of the second mechanism 9 assumes its rightmost position as shown in FIG. 1, separating the second portion 37 of the crunk shaft 38 away from the pin 15.

When, under this condition, the strup member 17 is pulled from the passenger room "PR", the lock lever 16 and the latch plate 14 are pivoted together in a counterclockwise direction in FIG. 1 against the force of the spring 18 releasing the striker 12 from the latch plate 14. Thus, further pulling of the strup member 17 can induce folding of the backrest part 3 producing a tunnel between the passenger room "PR" and the trunk room "TR".

When then the backrest part 3 is raised, the striker 12 projects into the slot 28a and pushes the curved peripheral portion 14a of the latch plate 14 against the force of the spring 18 and finally comes into latching engagement with the latch plate 14. Thus, the latch device returns to the above-mentioned first condition.

Figure 3:
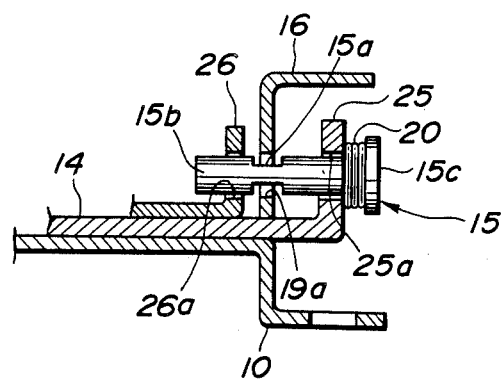

When now the knob 30 of the second mechanism 9 is shifted leftward in FIG. 1 by a person who stands outside of the vehicle and brought into engagement with the first notch 32, the first portion 37a of the crunk shaft 38 pushes the circular head portion 15c of the pin 15 against the force of the spring 20 to such a position as shown in FIG. 3 wherein the smaller diameter portion 15a of the pin 25 is aligned or matched with the narrow throat portion 19b of the recess of the lock lever 16. Under this condition, the latch plate 14 is prevented from pivoting in a so-called "striker releasing direction"(viz., in a counterclockwise direction in FIG. 1) due to abutment of the shaft 38 against the pin 15. However, the lock lever 16 is pivotal by a certain angle defined by the distance between the stopper pin 21 and the projection 23 of the lock lever 16.

Thus, if, under this lock condition, the strup member 17 is pulled from the passenger room "PR", the operator can easily recognize the locked condition of the backrest part 3 by feeling the spring-biased drawing of the strap member 17. Of course, the pulling of the strup member 17 does not induce releasement of the striker 12 from the latch plate 14 and thus does not induce the folding of the backrest When now the knob 30 of the second mechanism 9 is disengaged from the first notch 32 and shifted further leftward in the groove 31 and turned upward to be brought into engagement with the second notch 33 of the groove 31, the second portion 37b of the crunk shaft 38 is turned about the axis of the longer shaft part 35 and pushes the edge portion 25b of the latch plate 14 against the force of the spring 18 thereby releasing the striker 12 from the latch plate 14. The second portion 37b is so sized as to induce a forward folding of the backrest part 3 upon engagement of the knob 30 with the second notch 33 of the groove 31.

With the construction as described hereinabove, the latch device of the present invention has the following advantages which have not expected from the conventional latch devices.

The folding of the backrest part 3 can be carried out from the trunk room "TR". That is, as is described hereinabove, by manipulating only the knob 30 exposed to the trunk room "TR", the latched condition of the backrest part 3 is cancelled and the backrest part 3 is pushed forward.

Under the locked condition of the backrest part 3, the lock lever 16 is permitted to pivot about the pivot pin 11 against the force of the spring 18. Thus, if, under the locked condition, the strup member 17 is pulled by a passenger in the passenger room "RP", he can easily recognize the locked condition of the backrest part 3 by feeling the spring-biased drawing of the strap member 7. This prevents him from exerting such an abnormal force as to damage the latch device.

What is claimed is:

1. In a foldable backrest of an automotive seat, a latch device comprising:
    a striker secured to a fixed member other than said backrest;
    a base member secured to said backrest to move therewith;
    a latch plate pivotally supported by said base member, said latch plate being latchingly engageable with said striker when said backrest assumes a given raised position;
    a lock lever pivotally supported by said base member and having a portion contactable with a peripheral portion of said latch plate;
    biasing means for biasing said lock lever and said latch plate in the same direction;
    connecting means for selectively connecting said latch plate and said lock lever to achieve an integrated pivoting movement of said latch plate and said lock lever; and
    actuating means for actuating said connecting means, said actuating means including a projection which, upon operation of said actuating means, pushes said latch plate to rotate the same in a direction to cancel the latched engagement between said latch plate and said striker and at the same time to induce a folding of said foldable backrest.

2. A latch device as claimed in claim 1, in which said latch plate and said lock lever are pivoted about a common pivot pin secured to said base member.

3. A latch device as claimed in claim 2, in which said actuating means comprises:
    a base member secured to a fixed member other than said backrest, said base member having an elongate guide groove formed therein;
    a crunk shaft including a longer shaft part which is axially slidably received in said guide groove and a normally bent shaft part which is projected from said guide groove, said normally bent shaft part having said projection formed thereon;
    a knob fixed to said crunk shaft to move therewith; and
    knob holding means for holding said knob at a given position when said knob is turned about the axis of said longer shaft part by a given angle.

4. A latch device as claimed in claim 3, in which said knob holding means includes spaced first and second notches which are formed in said base member to be merged with said guide groove, each notch being so sized as to catch said knob.

5. A latch device as claimed in claim 4, in which said crunk shaft is biased in one axial direction to cause said knob to abut against an axial end of said guide groove.

6. A latch device as claimed in claim 3, in which said connecting means comprises:
    two spaced holders secured to said latch plate, said holders having aligned openings formed therethrough;
    a pin axially movably received in said aligned openings of said two spaced holders, said pin having a smaller diameter portion which is positioned between said two spaced holders;
    a free end of said lock lever, said free end being formed with a recess which comprises a circular portion and a narrow throat portion, said narrow throat portion being so sized as to allow only said smaller diameter portion of said pin to pass therethrough; and biasing means for biasing said pin to axially move in one direction relative to said spaced holders.

7. A latch device as claimed in claim 6, in which said pin has a circular head portion to which said normally bent shaft part of said crunk shaft is contactable.

8. A latch device as claimed in claim 7, in which one of said two holders has a side edge against which said projection of said normally bent shaft part of said crunk shaft abuts when said knob of said actuating means is caught by one of first and second notches in said base member.

9. A latch device as claimed in claim 2, further comprising stopper means by which the pivoting movement of said latch plate and said lock lever is limited.

10. A latch device as claimed in claim 9, in which said stopper means comprises:
 a stopper pin secured to said base member;
 means defining in said latch plate a recess, said recess receiving therein said stopper pin; and
 a projection formed on said lock lever, said projection being brought into abutment with said stopper pin when said lock lever is pivoted by a given angle.

11. A latch device as claimed in claim 10, further comprising a pull strap which is pivotally connected to said lock lever.

* * * * *